Figure 1:
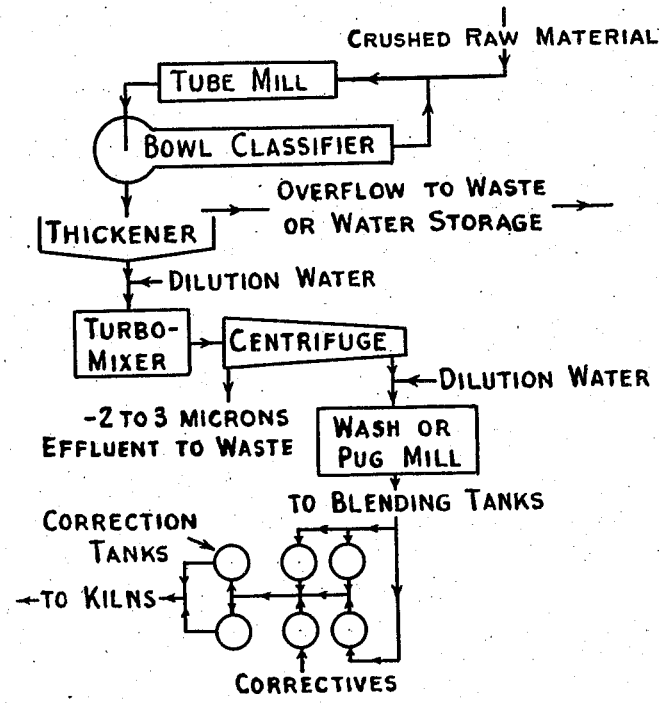

Sept. 10, 1940.   C. H. BREERWOOD   2,214,715

CEMENT MANUFACTURE

Filed June 2, 1939    2 Sheets-Sheet 1

INVENTOR
C.H. BREERWOOD.
BY
ATTORNEYS

Sept. 10, 1940.  C. H. BREERWOOD  2,214,715
CEMENT MANUFACTURE
Filed June 2, 1939  2 Sheets-Sheet 2

INVENTOR
C. H. BREERWOOD.
BY
ATTORNEYS

Patented Sept. 10, 1940

2,214,715

UNITED STATES PATENT OFFICE 2,214,715

CEMENT MANUFACTURE

Charles H. Breerwood, Narberth, Pa., assignor to Separation Process Company, Catasauqua, Pa., a corporation of Delaware Application June 2, 1939, Serial No. 277,004
In Great Britain June 30, 1938

22 Claims. (Cl. 106—25)

This invention relates to the manufacture of cement, specifically Portland cement, its modifications and other cements in which compounds of calcium and silicon are the principal constituents. More particularly, it has to do with the beneficiation, both chemically and physically, of available inferior cement raw materials, of a limited class, identified hereinafter, by a process in which grinding and centrifugal sedimentation, among other means, are employed in combination to effect reductions of the proportions of one or more of the constituent minerals of the natural material, whereby the treated material may be utilized as the ultimate raw material mixture desired for burning, the major proportion of the mixture, or a component of a mixture.

Throughout the specification and claims, the following terms are limited by definition: "siliceous" is used in a generic sense to refer to all mineral compounds of silicon; "silica" is limited to mineral forms of silicon dioxide, such as quartz, and "silicate" to mineral compounds of silicon and aluminum, such as sericite mica, and also compounds of silicon and magnesium, such as talc.

It is among the principal purposes of the invention to correct the proportions and ratios of the mineral sources of the four essential oxides, silica, alumina, iron oxide and lime, to be combined for the formation of cement clinker, especially for the production of modern types of cement, including those of low-heat of hydration, resistant to sulphates and chloride solutions, and of limited delayed expansion in concrete. Expressed in another way, the principal purposes are to reduce the proportion of alumina, to enable the production of cement low in tricalcium aluminate; to reduce the proportion of magnesia, a dangerous impurity or adulterant frequently present in materials of the class contemplated, and to retain the calcite and crystalline or crypto-crystalline forms of silica, such as quartz, flint, chert, etc., either to correct the relation between lime and silica or to change the proportion of at least one silicate mineral constituent at least to a degree that will permit a final correction of the ultimate composition, either by the addition of correctives or by other methods of treatment. If an available material, within the class to be defined, is to serve as the source of one component of a two-component mixture, i. e., a lime-bearing component and a siliceous component, the object is to process the component ordinarily to reduce the proportions of a silicate mineral or minerals, but sometimes to reduce the proportion of a compound or compounds of magnesium, or both, to render the material satisfactory for blending with the other component to produce the desired ultimate raw material mixture. It is a further purpose to reduce the proportion of alkalies, including combined forms and soluble alkalies, when present in the material, to provide for uniformly accurate setting time of the cement, avoid efflorescence in concrete, and to decrease delayed expansion. It is an important object to eliminate, almost entirely, colloidal matter and matter of colloidal behavior, by reference to natural flocculation, to improve the thickening characteristics, in a wet pulp, of the useful minerals to be retained, not only to limit the necessary capacity of the thickening or filtering equipment and its operating cost, but principally to permit the dewatering of the slurries to a satisfactory degree, to economize in fuel consumption in burning and to take the fullest advantage of available kiln capacity. With reference to the quality of the finished cement, it is an object to limit the proportion of mineral particle sizes under 2 microns, because I believe that these fine compounds are eutectic and are "overburned" at the temperatures required to combine the compounds of the coarser constituents. Further, as the proportion of silicates is relatively great in the minus 2 micron fraction, and because nascent silica is extremely active, this fraction should be eliminated from the final mixture. It will be understood that overburned compounds in cement lower early strength. Especially in view of the low commercial value of Portland cement, it is a further purpose to employ simple, but unusual methods of grinding, classification, centrifugal sedimentation and blending to effect the necessary separation of the silicate minerals and the undesirable constituents described and to prepare ultimate mixtures of accurate chemical composition, in a practical and economical manner.

Although restricted to the processing of a narrower class of materials, the present invention may be considered, within its field, to be an improvement of the method of my Patent No. 1,931,921 and a simpler alternative of the method of my Patent No. 2,144,254.

The inferior natural raw materials contemplated herein are limited to the class consisting of argillaceous limestones, marls, chalks, and siliceous components containing an undesirable or excessive proportion of one or more silicate minerals, beyond that desired for an ultimate cement raw material mixture, the class also including a limited variety of limestones, of relatively rare occurrence, contaminated by the impurity magnesium hydroxide, in the mineral form brucite. The class of minerals to which the process is appropriate is further limited to those in which the natural crystal size, or the particle size, of the silicate minerals, and impurities, is relatively much finer than the other mineral constituents or in which the silicate minerals, impurities, or both, are more readily reduced in grinding, in accordance with the preferred method of milling, to be referred to hereinafter.

I have discovered, that when appropriately ground, these silicate minerals can be caused to be greatly increased in proportion to the other constituent minerals in the low orders of particle size, concentration of silicates in quantities equal to the excessive proportion frequently occurring in the particle size fractions below 2 to 3 microns.

Gravity concentration methods, employing the conventional types of hydraulic classifiers, lack utility for the present purposes, principally because even when uneconomical quantities of dispersing agents are used, the lower limits of separation according to particle size, under favorable conditions, is at least as high as 15 to 20 microns. A separation or "cut" within this range involves a prohibitive loss of useful constituents, especially losses of fine calcite and silica in particle sizes favorable for reaction in burning to clinker, and upon which a disproportionate amount of grinding power has been expended. Further, this practice would require classification and final thickening equipment of impractical size, requiring enormous volumes of water, and the classification is inefficient and involves further losses, due to the trapping of large grains in fine floccules and the incomplete separation of fine particles from the coarser fractions. The presence of colloidal matter in the underflow promotes flocculation and limits the degree of dewatering.

The purposes of the invention, and the practice of the method, can best be explained by reference to argillaceous limestones, and particularly the "Bluestone" or "cement-rock" of the Lehigh Valley District of Pennsylvania. This raw material, being the most complex of the materials of the class described, will serve to illustrate the complete practice of the method, and to show how it may be applied to best advantage for the beneficiation of inferior materials of simpler composition.

This material may be described as a Jacksonburg limestone, almost invariably, with respect to any type of ultimate cement raw material mixture, deficient in calcite; excessive in siliceous matter, but deficient in mineral forms of silica; excessive in alumina; about satisfactory in iron oxide, but deficient in iron for some types of cement; contaminated with magnesia, ordinarily to a dangerous degree; contaminated by "graphitic" carbon, probably colloidal, and contaminated with alkalies, both combined and soluble.

The limestone selected for the examples is particularly suitable for purposes of illustration, as it is apparently the most difficult to beneficiate in accordance with the practice of the present method, the principal difficulty having to do with the unusually fine state of natural crystallization, and the wide distribution of the various constituents and the almost complete dispersion of colloidal or near-colloidal "graphitic" carbon. It is intermediate in composition between limestone and shale, the color and general appearance more nearly resembling slate, but calcite is the most abundant mineral. The other principal mineral constituents are quartz; mica, mostly of the sericite variety, but magnesian micas, probably phlogopite are believed to be present; talc; kaolin; iron, principally as the hydroxide, limonite; and dolomite, which contributes a substantial portion of the magnesia. The fineness and limited degree of crystallization make accurate identification by petrographic methods difficult, the difficulty being increased by the presence and dispersion of the colloidal carbon, but it is believed from analytical determinations and examinations of related metamorphosed limestones from the same locality, that finely divided clay minerals such as kaolin and talc are present and contribute to the proportions of alumina and magnesia, respectively. Thin sections of the rock reveal distinct layers of fine calcite grains alternating with thin layers of fine scaly and fibrous sericite. There are occasional elongate lenses and elongated isolated grains of quartz. The quartz is widely distributed, usually as fine grains in excess of ten microns in diameter. The carbonaceous matter is dispersed throughout the rock in intimate contact with the various constituents, and constitutes about one-half of 1% of the total mineral weight. Total alkalies are usually less than 1%, the normal range of the material in the locality being from 0.4 to 1.5%, depending particularly upon the proportion of micaceous matter.

As will appear more fully from the chemical analyses of the specimens referred to in the examples to be given hereinafter, this material is unsuitable for cement manufacture without substantial correction. The siliceous matter and alumina are too high, and the proportions of calcite and pure silica (quartz) are too low. In view of the abundance of alumina, correction of the lime-silica ratio by the usual addition of high grade limestone does not result in a mixture suitable for modern highway cement, for example, and this practice not only involves incomplete correction particularly with relation to alumina, but is enormously expensive because of the lack of reserves of high grade limestones in this producing district. The proportion of alumina also makes the material impractical, and sometimes useless, for the production of cement of moderate heat of hydration, and as the analyses will make obvious, additional correctives such as silica and iron oxide cannot be added as correctives to produce mixtures suitable for the manufacture of low-heat, and sulphate resisting types of cement. The proportion of alkalies is not dangerous but reductions are obviously desirable. The "graphitic" carbon is eliminated in burning, but has the disadvantage of contributing substantially to natural flocculation, thereby limiting the degree of dewatering.

The elimination of a part of the mica, together with fine clay minerals believed to be present, particularly kaolin and talc, will correct the relation between lime and total silica, and of more importance will increase the silica ratio, i. e. total silica divided by the sum of alumina and iron oxide, and will make a useful reduction of magnesia. This elimination may be carried either to a degree such that the proportions of the constituents are satisfactory for a desired ultimate mixture for the manufacture of a commercial cement, or to a degree that will permit final correction by the addition of correctives, as will appear more fully hereinafter.

In general, the invention comprises reducing the material by grinding the crushed raw materials at least to a degree that mineral bond breakage is sufficient to release the excessive proportion of the silicate mineral or minerals, together with proportions of contaminating minerals called impurities herein, if present, from the remainder of the constituents, the grinding being controlled so that the undesirable proportions of the minerals to be discarded are concentrated in the lowest orders of particle size. To this end, the material is preferably ground in a ball or tube mill in closed circuit with a hydraulic classifier, such as the Dorr bowl classifier, the operation being so controlled, especially by carrying a heavy circulating load, that the finished product of grinding, or bowl overflow, is removed from the grinding circuit as soon as a sufficient proportion of the silicate minerals has been released, and reduced if necessary to the finest orders of particle size, and with a minimum reduction to these orders of size of the useful constituents, particularly calcite and silica. I have discovered that micaceous matter has a relatively low sedimentation rate, the rate being about half that of other mineral particles, of the same maximum diameter, due to the characteristic particle shape, and that advantage of this can be taken not only to accomplish the ultimate removal of these particles without excessive grinding, but principally to avoid unnecessary reduction of calcite and quartz, with consequent losses thereof in the waste products to be described hereinafter. For brevity, particle size fractions minus 2 to 3 microns will be understood herein to include such oversized mica particles, if present, of equivalent sedimentation rates or behavior to particles of other minerals within these maximum sizes.

In some materials of the class described, particularly the metamorphosed limestones, the calcite and silica occur in relatively large, frequently visible, crystals, the rock being contaminated by inclusions of fine clay minerals, including mica, fairly widely dispersed. Such materials are preferably subjected to incomplete preliminary grinding in a ball mill to a degree sufficient to release the clay minerals, the ground materials then being separated by hydraulic classification, in one or more stages, into a coarse and a fine fraction. This separation is preferably accomplished in a bowl classifier or hydro-separator, for economy in power, and although such apparatus is relatively inefficient, as compared with centrifugal sedimentation machines, in that substantial proportions of the fine silicate minerals are present in the underflow, it will be realized that the silica ratio is considerably increased by this practice and, because alumina is an essential constituent of the ultimate mixture, a small proportion of fine clay minerals in the underflow can usually be tolerated. The classifier overflow represents a large proportion of the original materials, at least so large that its loss would be prohibitive. It comprises usually large proportions of relatively coarse calcite and quartz grains, and smaller proportions of silicate minerals, the latter occurring in increased proportion in the lowest orders of particle size. By removing a sufficient proportion of the lowest orders of particle size, the balance of the separator overflow may be recovered and blended in suitable proportions with the separator underflow to form all or a major proportion of the kiln feed, the re-combination of these two products preferably being made prior to final grinding of the separator underflow to improve the mixture and contact of the particles of the various constituent minerals, to insure complete reaction in the process of burning to clinker. This practice also simplifies the control of slurry dilution and handling.

I have discovered that centrifugal sedimentation machines of the type commonly employed for de-watering slurries and sometimes for the classification of solids can be operated in a novel manner to make an efficient separation of a small proportion of the weight of the feed as the particle size fractions below 2 to 3 microns, such machines being the only practical apparatus that I have discovered capable of separating at such low orders of particle size. Satisfactory machines of this type include the "Bird centrifuge," disclosed for example in Piper Patent No. 1,962,461, and the F. L. Smidth & Company centrifuge disclosed in United States application Serial No. 158,477, filed August 1, 1937.

The operation of the centrifugal separator for the purposes contemplated herein differs essentially from its use in de-watering by the overloading of the machine to such a degree that the undesirable, fine fractions are carried away as an effluent. By controlling the rate of feeding and the speed of the bowl or drum, and to a lesser degree the dilution of the feed, particle size fractions as fine as two microns and under can be separated efficiently, these fractions representing sometimes proportions as low as five to six percent of the total weight of the material, their composition, however, including a sufficient proportion of silicate minerals to complete, or at least permit, the correction of the balance of the material.

This practice also has the very great advantage of reducing the moisture content, the "cake" discharged from the centrifuge carrying a minimum of water, thereby making this product especially economical with relation to fuel economy and kiln capacity.

At the necessary dilution and due to the washing effect in the preliminary handling, and in the operation of the centrifuge, the soluble alkalies are dissolved and largely carried away in the effluent. For this reason, and also because colloidal slimes are usually abundant, thickening or attempts to flocculate and thicken the effluent for the recovery of the water are impractical and undesirable.

If natural flocculation is pronounced, and persistent in the feed to the centrifuge, the separation is improved by electrophoresis, or dispersing agents may be employed. Although dispersing agents are not used in the pulps of the first example to be given hereinafter, substantial flocculation is characteristic of them, and I have found that the dispersion is complete following introduction and agitation with approximately 2 pounds of calcium lignin sulphonate or sodium lignin sulphonate per ton of solids, and that about the same dispersion can be obtained with one pound of either agent used with one pound of soda ash, as more particularly described and claimed in my Patent No. 2,162,525. The effect of dispersion is illustrated in Example II.

Figure 2:
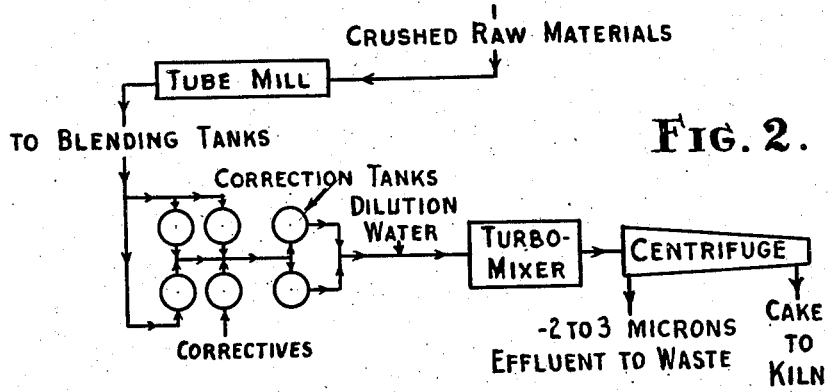
Figure 3:
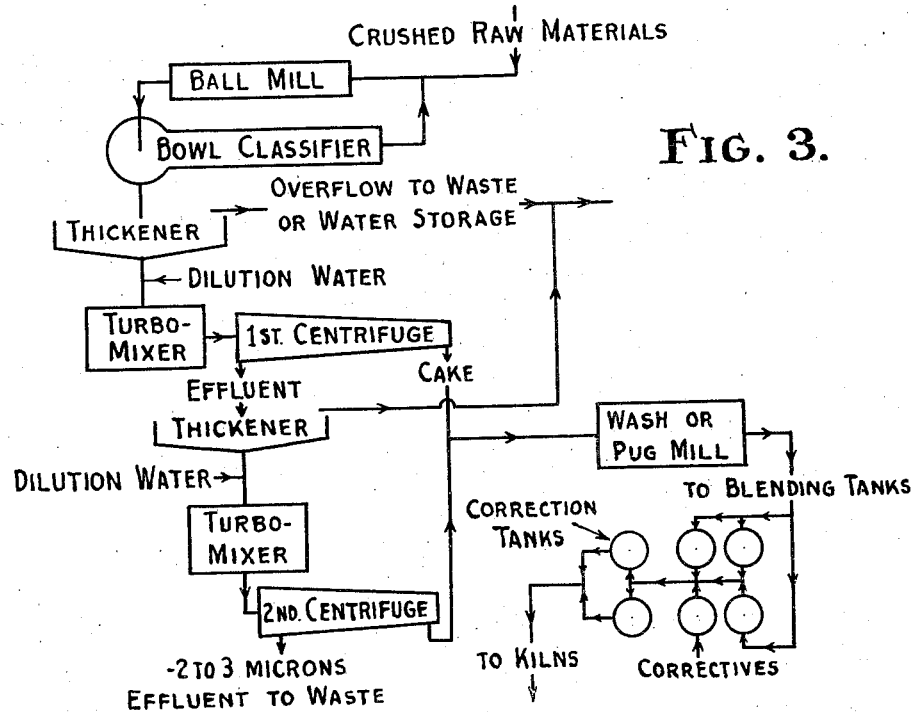
Figure 4:
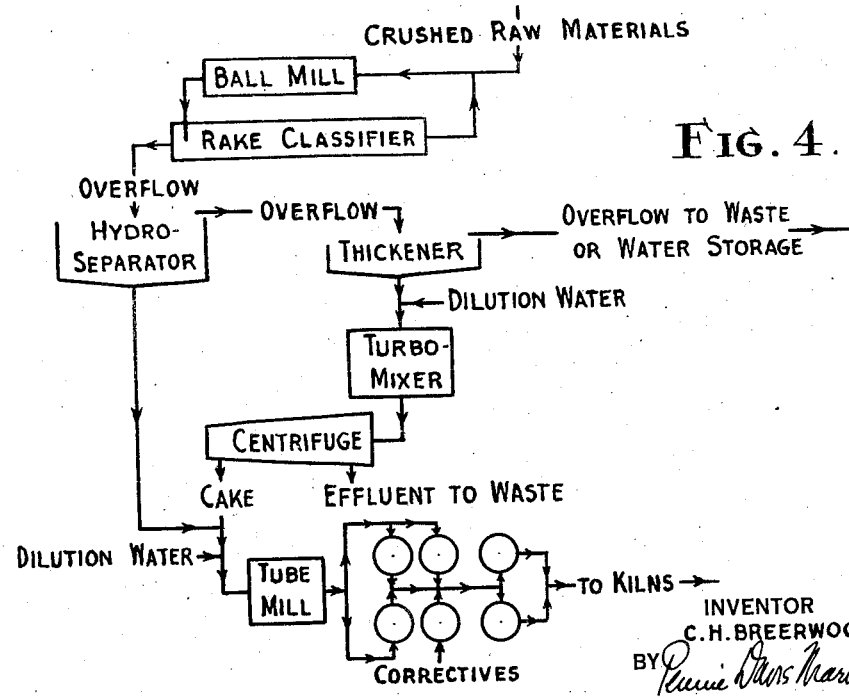

For a better understanding of the invention, reference is made to the accompanying drawings, in which Fig. 1 illustrates a preferred flow diagram for the processing of materials of fine crystallation and wide mineral distribution, Fig. 2 is a modified and simplified flow diagram appropriate for same type of minerals but in which only a limited reduction in the proportion of silicate minerals is necessary, Fig. 3 illustrates a modification of advantage in cases where the relatively coarser products of fine grinding are of high silica ratio, and Fig. 4 is a flow diagram, similar in principle to that of Fig. 3, and preferred for the treatment of materials in which the calcite at least, and the silica, if present in useful quantities, are relatively much more coarsely crystallized than the silicate minerals and contaminating impurities of the types described.

These flow diagrams illustrate the four general applications of the method for the processing of the four principal classes, particularly with reference to physical characteristics, of materials of the class contemplated herein, but it will be understood that in some measure these flow sheets are alternative and that various modifications may be made to suit specific local conditions. It will also be understood that similarly to all natural materials of sedimentary origin, the physical and chemical compositions of such materials vary throughout almost infinite ranges, and, accordingly, these flow sheets will serve to indicate the preferred practice of the method for the beneficiation of an available material, within the class described.

First, with reference to Fig. 1, it will be seen that the material, first crushed to the usual secondary crusher sizing, is ground in closed circuit, the circuit preferably including a bowl classifier operated with a heavy circulating load, whereby the finished products may be withdrawn from the circuit as bowl overflow with a minimum reduction of calcite and silica grains to the lowest orders of particle size, i. e. orders below approximately 3 microns. A satisfactory degree of grinding is shown hereinafter in the table of particle size distribution in Example I.

The overflow from the bowl classifier is preferably delivered to a thickener to decrease the dilution to at least 30% solids, and preferably lower dilution, to reduce power consumption and the necessary centrifuge capacity, the capacity of a centrifuge being proportional to the rate of feeding in gallons. The products are withdrawn from storage in the thickener to a turbo-mixer to maintain suspension and to provide a constant head, whereby the rate of feed to a centrifugal sedimentation machine can be controlled accurately. The operation of the centrifuge with reference to feeding rate, to feed dilutions and separating force expressed in multiples of gravity, will be understood from the specific examples given hereinafter. Essentially, the operation of the centrifuge comprises overloading to a degree that will cause the excessive proportion of silicate minerals, and impurities if present, to be carried away in the effluent, as the waste product of the process. If the natural materials are relatively of uniform composition and the apparatus, especially the speed of the centrifuge, is controlled by skilled workers, the coarse fractions or "centrifuge cake" may be controlled accurately in composition, and under these conditions is ideal for feeding directly to the kilns, in view of the low moisture content. However, in view of the usual variation in material, and to provide for flexibility in the control of composition of the ultimate mixture, and also to permit the addition of correctives for the production of various types of cements, the centrifuge cake is delivered to a wash or pug-mill where it is diluted to a sufficient slurry moisture content to permit blending, usually about 35% water, and then stored in the usual blending or correction tanks where ground correctives such as silica, iron oxide, or proportions of the untreated natural materials may be added to complete the ultimate correction for the production of the desired type of cement.

The flow diagram of Fig. 2 has been found to be satisfactory for the processing of materials of an existing cement mill in the Lehigh Valley District, in which the rock is now ground in tube mills in open circuit. These materials are of such composition that they can be blended after milling to produce a uniform natural mixture somewhat high in alumina, at 74.0% CaCO$_3$, or approximately 1.5% below ordinary cement raw material composition with respect to CaCO$_3$. This mixture is correctible by centrifugal sedimentation to produce a mixture satisfactory for commercial cement. The proportion of alumina in the form of fine silicates, including mica, is too high to permit satisfactory correction, for the production of low heat and special cements, by centrifugal sedimentation alone. To produce these types, I have found that the composition may most easily and economically be corrected by adding ground correctives such as silica and iron oxide to the blended products above described. The mixed materials are then diluted to about 35% solids and subjected to centrifugal separation controlled to eliminate approximately 7.5% of the total mineral weight, and although this separation involves the waste of materials having a calcite grade of 55%, the calcite is of extreme fineness, and the cake discharged from the centrifuge is chemically corrected and offers substantial economies in fuel consumption and kiln capacity as the moisture content has been reduced to under 22%. It will be seen that this degree of de-watering is considerably greater than can be accomplished by the usual thickener, both de-watering and mineral separation being accomplished as a single step, or without requiring a second stage of centrifugal sedimentation.

In Fig. 3, I have shown a flow diagram particularly advantageous in providing flexibility in control to produce various types of ultimate mixtures, and especially advantageous where the relatively coarser products of fine grinding are of high silica ratio, even though bond breakage between calcite and silica may be incomplete. The raw material chosen for the illustrative Example IV, to explain this application of the method, was substantially identical to that of Example I, for purposes of illustration and comparison, although bond breakage of the silicate minerals in the coarse fraction is not complete.

In the operation according to this flow diagram, the bowl classifier is operated with a heavy circulating load and controlled, for example, to overflow products minus about 200 mesh. These products are sent to storage in a thickener and prepared for a first stage of centrifugal sedimentation in a turbo-mixer providing a constant head and from which materials may be withdrawn at a desired constant rate. In the first stage of centrifugal sedimentation, the operation is controlled to provide a cake, or coarse fraction, the effluent being minus 30 microns. The effluent is similarly stored and thickened and withdrawn under constant head and delivered to a second stage of centrifugal sedimentation, the effluent of which carries away, as the waste product of the process, the particle size fractions less than about 2 to 3 microns. The cake from the two stages of sedimentation may be proportioned prior to dilution, but in view of difficulties of handling and storage I prefer to deliver these products to a wash or pug-mill in which they are diluted sufficiently to permit blending and from which they are pumped to blending tanks where they may be more conveniently proportioned and any necessary quantities of ground correctives may be added to complete the ultimate mixture. It will be seen that, even by this practice, the kiln feed moisture content can be maintained much lower than that obtainable in the usual thickener of the products of closed-circuit grinding.

Fig. 4 illustrates a modification of the flow diagram of Fig. 3 appropriate to materials in which the useful constituents are coarsely crystallized, but the silicate minerals or contaminating impurities, are naturally fine. The metamorphosed limestones are examples of this class, the calcite and silica being coarsely crystallized, the rock being contaminated with clay inclusion and micaceous matter, the latter usually lying along the bedding planes. The material is preferably ground in a preliminary ball mill in closed circuit with a rake classifier, the overflow of which is discharged into a classifier, preferably a hydro-separator, the classification dilutions being controlled to discharge an underflow of high ratio, the overflow being thickened to decrease the load on the centrifugal sedimentation apparatus. The thickened classifier overflow is delivered under constant head conditions, provided by a turbo-mixer, to a centrifuge controlled to discharge an effluent including a sufficient proportion of the weight of the feed to eliminate the excessive proportion of silicate minerals. If relatively coarsely crystallized micaceous matter is present, I have found that the "split" or "cut" can safely be made at a maximum particle size considerably above actual 3 micron diameters without substantial loss of calcite and silica. The centrifuge cake is preferably combined with the bowl classifier underflow and ground with the latter to the ultimate particle size ranges satisfactory for burning to clinker in a tube mill. This practice, in addition to simplifying dilution, has the important chemical advantage of providing for intimate mixture and contact of the mineral particles, essential for complete reactions in burning to clinker. In order that the control of composition for the production of various types may be accomplished in a simple manner, the centrifuge cake may be stored and proportioned with the underflow prior to final grinding, the product of this mill being sent to storage in blending tanks where the desired final corrections can be accomplished conveniently.

If the available materials are of the type amenable to correction in accordance with the flow diagram of Fig. 4, or those in which the useful constituents are finer but of the coarser crystalline types for which the flow diagram of Fig. 3 is preferred, the process may be applied to Dry Process cement manufacture with a minimum of change in existing equipment and its operation.

If the calcite and silica are coarsely crystallized but contaminated by fine clay minerals, the material is preferably ground in a preliminary ball mill, the products of which are subjected to air separation, in an apparatus such as a "Sturtevant separator," to provide a high ratio tailing, which is processed in a dry state throughout the remainder of the process, and a fine fraction. The fine fraction is then suspended in water as in a wash-mill or turbo-mixer, where water is added to form a suspension, usually at a density of about 35% solids. The diluted fine fraction is withdrawn to a turbo-mixer, operated to provide a constant head, and from which it is fed to a centrifuge, to separate the undesirable proportion of silicates. The centrifuge cake, being of low moisture content, may be dried economically as by waste heat of the kilns, the dried cake being preferably proportioned and ground with the air separator tailings to provide for intimate mixture and particle contact. The products of final grinding may be further mixed and blended by the usual dry process means, such as the method of Morrow Patent 1,812,604.

If the materials are of the type for which the flow diagram of Fig. 3 is more appropriate, the air separator tailings may be conveyed directly to the blending silos where they may be blended with the dried centrifuge cake by the methods preferred to above.

EXAMPLE I

The raw material of the first example was a specimen of Lehigh Valley "Bluestone" of the mineral composition described in detail previously. Re-crystallization is so incomplete that extremely fine grinding must be resorted to to free a sufficient proportion of the micaceous matter, particularly sericite, and other clay minerals and colloidal matter; petrographic examinations of ground specimens having disclosed that mineral bond breakage is incomplete in the particle size fractions above 20 microns. As will be evident from the chemical composition to be given in the table hereinafter, this material is below composition in calcium carbonate, excessive in total siliceous matter, but deficient in mineral silica, excessive in alumina, the silica ratio being too low to permit correction by the addition of high grade limestone for the production of an ultimate mixture satisfactory for modern commercial Portland cement. The principal objective in the treatment of this material is to reduce the proportion of alumina by the removal of fine silicates including sericite, although other desirable eliminations are made, the ultimate composition requiring correction only by the addition of a small amount of silica, iron oxide, or both.

This material was treated in accordance with flow diagram of Fig. 1, the material being ground in closed circuit, without dispersing agents, the ground products being then subjected to centrifugal sedimentation in a laboratory type F. L. Smidth & Company centrifuge. The pulp was held to a dilution of 70% water and was fed at the rate of about 17 cu. ft. an hour, the dilution increasing to 90% in the effluent. The machine was operated at a speed sufficient to produce a separating force of about 1,000 times gravity. The purpose of this operation was to separate a fine fraction substantially of 3 microns and under, including micaceous matter in particle sizes about double in maximum diameter but having equivalent sedimentation behavior.

The fineness of the ground material, as subjected to centrifugal sedimentation, or the "head sample" and that of the separated products resulting from two typical tests are expressed in terms of cumulative percentages of weight below maximum sizes in the following table of particle size distribution:

*Physical analyses as percent minus*

| Size in microns | Head sample | Test No. 1 | | Test No. 2 | |
|---|---|---|---|---|---|
| | | Cake | Effluent | Cake | Effluent |
| −50 | 96.5 | 95.0 | 100.0 | 93.5 | 100.0 |
| −20 | 74.0 | 67.5 | 100.0 | 72.0 | 100.0 |
| −10 | 48.5 | 34.5 | 98.0 | 36.5 | 100.0 |
| −5 | 25.0 | 16.0 | 68.0 | 19.0 | 91.0 |
| −3 | 16.5 | 9.0 | 48.0 | 11.0 | 60.5 |
| −2 | 12.5 | 6.5 | 31.5 | 7.0 | 38.0 |
| −1.2 | 8.5 | 6.0 | 18.0 | 4.5 | 23.0 |

By reference to the foregoing table, it will be seen that the fine products or "effluent," were effectively separated and it will be understood that the particles in the effluent in excess of 5 microns in size are largely micaceous.

The chemical analyses and the products of test No. 2 are as follows:

| Test No. 2 | Analyses as percent | | |
|---|---|---|---|
| | Head sample | Cake (recovery) | Effluent (waste) |
| Percent weight | 100.0 | 87.5 | 12.5 |
| $SiO_2$ | 14.23 | 13.78 | 19.18 |
| $Al_2O_3$ | 6.44 | 5.27 | 9.86 |
| $Fe_2O_3$ | 0.89 | 0.83 | 2.60 |
| $CaCO_3$ (titration) | 74.0 | 76.2 | 58.4 |
| CaO | 40.9 | 42.1 | 32.6 |
| MgO | 1.9 | 1.76 | 1.79 |
| Ignition loss | 35.7 | 36.3 | 37.7 |
| Total | 100.06 | 100.04 | 98.7 |
| Silica ratio | 1.94 | 2.26 | 1.59 |

It will be seen that the recovered material or cake represents 87.5% of the original weight, that the $CaCO_3$ is slightly above an ultimate composition, and the silica ratio has been raised to 2.26, even though the proportion of iron oxide was lowered. The alumina has been reduced by 1.17%. The loss of quartz in the effluent was negligible, the loss in $SiO_2$ being represented by silica in combination, as in mica. This material is, therefore, readily correctible, for the production of commercial cement of high quality, by the addition of a small proportion of silica, such as sand, or silica and iron oxide.

EXAMPLE II

The head samples of the following tests were from the same source and were intended to be as nearly identical to each other and the material of Example I, in chemical composition, as possible. The materials were processed under generally similar conditions, excepting that increasing quantities of dispersing agent were used to permit a decrease of the pulp dilution prior to centrifugal sedimentation, to economize in centrifuge power and capacity, and to increase the degree of silicate separation or maintain the same degree of separation at lower feed dilutions.

The materials were ground in closed circuit as follows: those of test 3, with 1 lb. per ton of calcium lignin sulphonate, the centrifuge feed dilution being reduced to 63.5% water; those of test 4 with 2 lbs. per ton of calcium lignin sulphonate, the feed dilution being reduced and maintained at 55.0% water, and those of test 5, with 3 lbs. of calcium lignin sulphonate, the feed dilution also being maintained at 55.0% water.

The physical results of grinding and centrifugal sedimentation, expressed in terms of cumulative percentages of weight below maximum sizes, were as follows:

*Physical analyses as per cent minus*

| Size in microns | Test No. 3 | | Test No. 4 | | Heads | Test No. 5 | |
|---|---|---|---|---|---|---|---|
| | Cake | Waste | Cake | Waste | | Cake | Waste |
| −50 | 95.0 | 100.0 | 96.0 | 100.0 | 97.5 | 95.5 | 100.0 |
| −20 | 75.5 | 97.0 | 75.0 | 100.0 | 79.0 | 75.0 | 100.0 |
| −10 | 46.5 | 96.5 | 43.5 | 100.0 | 54.0 | 44.0 | 100.0 |
| −5 | 21.0 | 90.5 | 17.0 | 96.0 | 29.5 | 20.5 | 100.0 |
| −3 | 11.0 | 72.0 | 11.5 | 78.0 | 21.5 | 12.0 | 92.0 |
| −2 | 7.5 | 47.0 | 8.5 | 54.0 | 16.5 | 7.0 | 70.2 |
| −1.2 | 4.0 | 24.0 | 4.0 | 28.0 | | 3.5 | 42.5 |

I have found that the use of dispersing agents, as described, in quantities equal to a rather critical minimum, not only permits substantially decreased dilutions, in the feed to the centrifuge, without impairing the efficiency of separation, but with improved results, in most cases. This is illustrated in the foregoing table from which it will be seen that the use of one pound of calcium lignin sulphonate per ton failed to produce as effective results, at a dilution of 63.5% water, as those obtained in test No. 2, of Example II, at the greater dilution of 70% and without a disperser. It will be seen from the waste product, or effluent of test No. 4, that 2 pounds per ton of the disperser resulted in a greatly improved separation, over test No. 2. The use of an increased quantity of disperser, for example the three pounds per ton of test No. 5, makes an enormous improvement, but for practical purposes, with relation to this material, at least, the improvement is of no advantage with relation to chemical correction, because the correction requires the elimination of the minus 3 micron fraction, test No. 4 showing that this may be accomplished at the same dilution with only 2 pounds of the disperser. The use of large proportions is, accordingly, unwarranted, as uneconomical, but large quantities are undesirable, if the products of separation are to be subjected to froth flotation, as more particularly described and claimed in my co-pending applications Serial Nos. 281,593 and 281,594, filed June 28, 1939. The fineness of the head sample of test No. 5 is given to illustrate the effect of the disperser in grinding, by comparison with the head sample of Example I.

The effect of the separation, with relation to weight recovery and changes in the proportion of calcite are given below, the complete analyses being omitted, for brevity, as the results are comparative to those of Example I.

| Test No. | Separation in microns | Percent $CaCO_3$ | | | Percent weight | |
|---|---|---|---|---|---|---|
| | | Heads | Cake | Waste | Cake | Waste |
| 3 | Minus 3.6 | 74.3 | 76.8 | 57.0 | 87.4 | 12.6 |
| 4 | Minus 3.0 | 74.0 | 76.9 | 55.8 | 87.5 | 12.5 |
| 5 | Minus 3.1 | 73.5 | 76.0 | 55.9 | 86.2 | 13.8 |

It will be apparent, from the above, that test No. 4 accomplished the best results with relation to grade and weight recovery, this test demonstrating that the proper use of dispersers is highly advantageous, by comparison with test No. 2, from which it will be seen that although the dilution was reduced from 70% to 55% water, the same weight recovery was obtained with an increase in calcite grade from 76.2 to 76.9%.

EXAMPLE III

The following table is inserted to illustrate the results that may be obtained, in accordance with the flow diagram of Fig. 1, and with materials substantially identical to and from the same source as those of the previous examples, with a somewhat modified sedimentation operation, likewise without dispersing agents. The sedimentation machine used was a Bird centrifuge. The operating conditions of test No. 6 were typical and were as follows:

| | |
|---|---|
| Bowl | 18"x28" |
| Bowl speed | 1895 R. P. M. |
| Screw speed | 24.8 R. P. M. |
| Force, times gravity | 985 |
| Feed in g. p. m. | 5.3 |
| Per cent water, feed | 65.2 |
| Per cent water, waste | 95.0 |
| Per cent water, cake | 25.0 |

The individual tests were to determine the effect on correction of separating different weights of the lowest orders of particle size in the effluent. The object of test No. 7, for example, being to separate a fraction of about 75% minus 2 microns, to limit the total weight loss, the loss being 6.6% and that of test No. 6, to increase the loss, the actual loss being 8.9%, the cumulative particle size distribution of the effluent of the latter being 1.5% plus 10 microns; 4.5% plus 5 microns; 30.0% plus 2 microns, and 70% minus 2 microns. The head samples for tests Nos. 6 and 7 were identical as were those of tests Nos. 8 and 9.

Analyses as percent

| | Heads | Test No. 6 | | Test No. 7 | | Heads | Test No. 8 | | Test No. 9 | |
|---|---|---|---|---|---|---|---|---|---|---|
| | | Cake | Waste | Cake | Waste | | Cake | Waste | Cake | Waste |
| Percent weight | | 91.1 | 8.9 | 85.0 | 15.0 | | 93.4 | 6.6 | 88.8 | 11.2 |
| SiO2 | 13.60 | 12.90 | 17.84 | 12.96 | 17.28 | 13.96 | 13.78 | 16.58 | 13.72 | 16.60 |
| Fe2O3 | 1.80 | 1.44 | 2.63 | 1.51 | 2.45 | 1.83 | 1.80 | 2.16 | 1.80 | 2.30 |
| Al2O3 | 5.56 | 5.16 | 11.71 | 4.55 | 10.89 | 5.48 | 5.14 | 10.94 | 4.76 | 10.24 |
| CaCO3 | 74.1 | 76.4 | 57.3 | 76.96 | 60.0 | 73.66 | 75.0 | 61.5 | 75.91 | 61.95 |
| MgCO3 | 4.27 | 4.12 | 5.22 | 3.86 | 5.08 | 4.31 | 3.56 | 5.15 | 4.06 | 5.96 |
| Silica ratio | 1.84 | 1.96 | 1.23 | 2.12 | 1.29 | 1.91 | 2.09 | 1.26 | 2.10 | 1.31 |

It will be seen, from test No. 8, that a removal of fines, representing 6.6% of the weight is insufficient to bring the CaCO3 up to composition for ordinary commercial cement, that the removal of 8.9% of the weight raises the grade about 1% above composition, and that removal of 15%, test No. 7, raises the CaCO3 and reduces the alumina sufficiently to permit the addition of silica and iron oxide, to satisfy the specification of the New Jersey State Highway Department for highway cement.

EXAMPLE IV

The following tests illustrate the practice of the method in accordance with the flow diagram of Fig. 3, the material selected for the tests being identical in physical and chemical analysis to that of tests Nos. 8 and 9 of Example III, for purposes of direct comparison to simplify understanding of the invention. It will be understood, however, that the preferred method of processing this material is in accordance with Fig. 1, because the degree of grinding required to release a sufficient proportion of fine silicate minerals results in a mill product of such fineness that two-stage sedimentation does not improve the results. The modified method is, accordingly, appropriate where the calcite and silica are more coarsely crystallized and the particle size distribution includes quantities much coarser fractions.

The first stage of sedimentation was conducted to separate the materials at about 30 microns, the centrifuge being operated to produce a separating force equivalent to 191 times gravity, and the second sedimentation at a force equivalent to 650 times gravity. I have found that substantially similar results can be obtained by operating both stages at the higher speed but with the separation controlled by regulating the rate of feed.

In the following table percentage weight refers to the total weight.

Analysis as percent

| | Heads | 1st cake | 2nd cake | Final waste |
|---|---|---|---|---|
| Percent weight | | 64.0 | 26.5 | 9.5 |
| SiO2 | 13.96 | 13.20 | 13.86 | 17.82 |
| Fe2O3 | 1.83 | 1.76 | 1.94 | 2.30 |
| Al2O3 | 5.48 | 3.96 | 6.34 | 9.72 |
| CaCO3 | 73.66 | 76.61 | 72.86 | 58.2 |
| MgCO3 | 4.31 | 3.81 | 4.52 | 5.53 |
| Silica ratio | 1.91 | 2.32 | 1.67 | 1.27 |

EXAMPLE V

This example illustrates the practice of the modified method of Fig. 4, the material selected being substantially identical to that of test No. 5 of Example II, for purposes of comparison, and although the correction is incomplete with respect to CaCO3 content, final correction can be accomplished by the addition of high grade limestone, in view of the reduction in alumina. It will be recalled that this flow diagram is appropriate to materials containing coarsely crystallized calcite, and silica, and fine clay minerals, whereby a classifier underflow of high silica ratio may be obtained.

The material was ground to minus 48 mesh sieve, and subjected to hydro-separation in the presence of 0.4 pound of disperser per ton, operation being controlled to make the separation at 325 mesh. The underflow represented 44.8% of the weight, the grade of which increased to 74.5% CaCO3. The overflow of 55% of the weight was reduced in grade to 72.3% CaCO3.

The overflow was then subjected to centrifugal sedimentation in the Smidth centrifuge, at a dilution of 59.0% water, separation being made at 3.1 microns. This separation produced a cake of 87.4% of the weight of the centrifuge feed at a grade of 75.3% CaCO3 and an effluent of 12.6% weight (approximately 7% of the original weight) at a grade of 52.3% CaCO3.

EXAMPLE VI

This example is intended to illustrate the reduction of a proportion of an impurity from a part of an available material supply, to make the part usable and thereby reduce quarrying and general processing costs. The material was limestone of high grade, but contaminated by magnesia in the mineral form, brucite. The brucite was widely dispersed, among the calcite crystals, as relatively coarse, visible crystals. The brucitic limestone itself is dispersed throughout a deposit including uncontaminated calcite, and can be eliminated by sorting prior to crushing, but with an obvious loss of its useful constituent, calcite.

The brucitic limestone was ground to minus 80 mesh and subjected to a single stage of sedimentation at a cut at about 10 microns, with the following results:

|  | Percent weight | Percent CaO | Percent MgO |
|---|---|---|---|
| Plus 10 microns | 86.6 | 43.40 | 12.70 |
| Minus 10 microns | 13.4 | 20.10 | 22.60 |

The reduction in magnesia is probably attributable to the lower hardness of brucite, as compared to calcite. The separation, by this simple treatment, although incomplete, is sufficient to permit the use of the coarse fractions with the high grade limestone of the same deposit.

With respect to the general classification of inferior materials, for the processing of which the present process is applicable, it will be realized that either when the silicate and contaminating minerals are highly increased in the lower orders of sizes, after grinding, and sharp separations can be made, or when only a limited correction is necessary, the available materials may be divided into two proportions, one of which is processed to eliminate the total excessive proportion of the undesirable mineral or minerals, the recovered material then being blended with the untreated portion to produce the corrected ultimate mixture.

It should be understood that in the practice of the method in accordance with the procedure of each of the foregoing examples, that the carbonaceous matter was largely concentrated in the effluent and accordingly wasted. Likewise, the effluent carried most of the soluble alkalies, the alkali content being further reduced by the elimination of that in combination in the micaceous matter. Further, that although the magnesia was only slightly decreased in the recovered products, it is significant that the proportion of dolomite would be expected to increase with the increase in calcite, the result being attributable to the removal of substantial proportions of the available talc and possibly magnesian micas. Although high ratio silica and iron oxide are referred to above as the usual correctives, it will be understood that where limited correction is sufficient, limestones, or the like, including proportions of the untreated natural material may be blended with the centrifuge cake to make the desired ultimate correction.

I claim:

1. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, subjecting a slurry of the material so ground to centrifugal sedimentation so correlated as to the speed of operation and the rate of introduction and the dilution of the material that the low orders of particle size are cut and separated as an effluent including said proportion of undesirable mineral, and burning the remainder of said material as at least a substantial proportion of the ultimate cement raw material mixture.

2. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, the material being removed from the grinding operation before unnecessary reduction to such orders of size of useful constituents of the material, subjecting a slurry of the material so ground to centrifugal sedimentation so correlated as to the speed of operation and the rate of introduction and the dilution of the material that the low orders of particle size are cut and separated as an effluent including said proportion of undesirable mineral, and burning the remainder of said material as at least a substantial proportion of the ultimate cement raw material mixture.

3. In a method of manufacturing cement clinker in which an available inferior material is utilized, and in which the material is a member of the class consisting of argillaceous limestones, marls, chalks, and siliceous components, each containing an undesirable proportion of at least one silicate mineral constituent which can be released and increased in proportion in the low orders of particle size by grinding the material; the improvement which comprises grinding the material to a degree sufficient to free physically a proportion of silicate particles at least equal to the undesirable proportion and to concentrate said proportion and increase the relative proportion of the silicate constituent to the proportions of useful constituents of the material in the low orders of particle size, subjecting a slurry of the material so ground to centrifugal sedimentation so correlated as to the speed of operation as the rate of introduction and the dilution of the material that the low orders of particle size are cut and separated as an effluent including said proportion of silicate constituent, and burning the remainder of said material as at least a substantial proportion of the ultimate cement raw material mixture.

4. In a method of manufacturing cement clinker in which an available inferior material is utilized, and in which the material is a member of the class consisting of argillaceous limestones, marls, chalks, and siliceous components, each containing an undesirable proportion of at least one silicate mineral constituent which can be released and increased in proportion in the low orders of particle size by grinding the material; the improvement which comprises grinding the material to a degree sufficient to free physically a proportion of silicate particles at least equal to the undesirable proportion and to concentrate said proportion and increase the relative proportion of silicate constituent to the proportions of useful constituents of the material in the low orders of particle size, the material being removed from the grinding operation before unnecessary reduction to such orders of size of useful constituents of the material, subjecting a slurry of the material so ground to centrifugal sendimentation so correlated as to the speed of operation and the rate of introduction and the dilution of the material that the low orders of particle size are are cut and separated as an effluent including said proportion of silicate constituent, and burning the remainder of said material as at least a substantial proportion of the ultimate cement raw material mixture.

5. In a method of manufacturng cement clinker in which an available inferior material is utilized, and in which the material is a member of the class consisting of argillaceous limestones, marls, chalks, and siliceous components, each containing an undesirable proportion of silicate minerals including at least micaceous matter which can be physically released and increased in proportion in the low orders of particle size by grinding the material; the improvement which comprises grinding the material to free physically a proportion of silicates at least equal to the undesirable proportion and to concentrate said proportion and increase the relative proportion of silicates to the proportion of useful constituents of the material in the low orders of particle size, subjecting a slurry of the material so ground to centrifugal sedimentation so correlated as to the speed of operation and the rate of introduction and the dilution of the material that the low orders of particle size, and larger particles of micaceous matter having sedimentation characteristics equivalent to such orders of size, are cut and separated as an effluent including said proportion of silicates, and burning the remainder of said material as at least a substantial proportion of the ultimate cement raw material mixture.

6. In a method of manufacturing cement clinker in which an available inferior material is utilized, and in which the material is a member of the class consisting of argillaceous limestones, marls, chalks, and siliceous components, each containing an undesirable proportion of silicates and impurities which can be released and increased in proportion in the low orders of particle size by grinding the material; the improvement which comprises grinding the material to a degree sufficient to free physically a proportion of silicates and impurities at least equal to the undesirable proportion and to concentrate said proportion and increase the relative proportion of silicates and impurities in the low orders of particle size, subjecting a slurry of the material so ground to centrifugal sedimentation so correlated as to the speed of operation and the rate of introduction and the dilution of the material that the low orders of particle size are cut and separated as an effluent including said proportion of undesirable silicates and impurities, and burning the remainder of said material as at least a substantial proportion of the ultimate cement raw material mixture.

7. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, subjecting a slurry of the material so ground to centrifugal sedimentation so correlated as to the speed of operation and the rate of introduction and the dilution of the material that the orders of particle size below a range of about 2 to 3 microns are cut and separated as an effluent including said proportion of undesirable mineral, and burning the remainder of said material as at least a substantial proportion of the ultimate cement raw material mixture.

8. In a method of manufacturing cement clinker in which an available inferior material is utilized, and in which the material is a member of the class consisting of argillaceous limestones, marls, chalks, and siliceous components, each containing an undesirable proportion of at least one silicate mineral constituent which can be released and increased in proportion in the low orders of particle size by grinding the material; the improvement which comprises grinding the material to a degree sufficient to free physically a proportion of silicate particles at least equal to the undesirable proportion and to concentrate said proportion and increase the relative proportion of the silicate constituent to the proportions of useful constituents of the material in the low orders of particle size, subjecting a slurry of the material so ground to centrifugal sedimentation so correlated as to the speed of operation and the rate of introduction and the dilution of the material that the orders of particle size below a range of about 2 to 3 microns are cut and separated as an effluent including said proportion of silicate constituent, and burning the remainder of said material as at least a substantial proportion of the ultimate cement raw material mixture.

9. In a method of manufacturing cement clinker in which an available inferior material is utilized, and in which the material is a member of the class consisting of argillaceous limestones, marls, chalks, and siliceous components, each containing an undesirable proportion of silicate minerals including at least micaceous matter which can be physically released and increased in proportion in the low orders of particle size by grinding the material; the improvement which comprises grinding the material to free physically a proportion of silicates at leaast equal to the undesirable proportion and to concentrate said proportion and increase the relative proportion of silicates to the proportion of useful constituents of the material in the low orders of particle size, subjecting a slurry of the material so ground to centrifugal sedimentation so correlated as to the speed of operation and the rate of introduction and the dilution of the material that the orders of particle size below a range of about 2 to 3 microns, and larger particles of micaceous matter having sedimentation characteristics equivalent to such orders of size, are cut and separated as an effluent including said proportion of silicates, and burning the remainder of said material as at least a substantial proportion of the ultimate cement raw material mixture.

10. In a method of manufacturing cement clinker in which an available inferior material is utilized and in which the material is a member of the class consisting of argillaceous limestones, marls, chalks, and siliceous components, each containing an undesirable proportion of at least one silicate mineral constituent which can be released and increased in proportion in the low orders of particle size by grinding the material; the improvement which comprises grinding the material to a degree sufficient to free physically a proportion of silicate particles and increase the relative proportion of the silicate constituent to the proportions of useful constituents in the low orders of particle size, subjecting the ground material to classification to separate a portion comprising the coarser particle sizes from a portion comprising the finer sizes, subjecting a slurry of the finer portion to centrifugal sedimentation so correlated as to the speed of operation and the rate of introduction and the dilution of the material that the low orders of particle size are cut and separated as an effluent, and burning the remainder of the finer proportion as at least a substantial proportion of the ultimate cement raw material mixture.

11. In a method of manufacturing cement clinker in which an available inferior material is utilized, and in which the material is a member of the class consisting of argillaceous limestones, marls, and chalks, each containing an undesirable proportion of at least one silicate mineral constituent which can be released and increased in proportion in the low orders of particle size by grinding the material; the improvement which comprises grinding the material to a degree sufficient to free physically a proportion of silicate particles at least equal to the undesirable proportion and to concentrate said proportion and increase the relative proportion of the silicate constituent to the proportions of useful constituents of the material in the low orders of particle size, subjecting the ground material to classification to separate a portion comprising the coarser particle sizes from a portion comprising the finer sizes, subjecting a slurry of the finer portion to centrifugal sedimentation so correlated as to the speed of operation and the rate of introduction and the dilution of the material that the low orders of particle size are cut and separated as an effluent including said proportion of silicate constituent, combining and mixing the remainder of the finer portion with the coarser portion, and burning the mixture as at least the major proportion of the ultimate cement raw material mixture.

12. In a method of manufacturing cement clinker in which an available inferior material is utilized, and in which the material is a member of the class consisting of argillaceous limestones, marls, and chalks, each containing an undesirable proportion of at least one silicate mineral constituent which can be released and increased in proportion in the low orders of particle size by grinding the material; the improvement which comprises grinding the material to a degree sufficient to free physically a proportion of silicate particles at least equal to the undesirable proportion and to concentrate said proportion and increase the relative proportion of the silicate constituent to the proportions of useful constituents of the material in the low orders of particle size, subjecting the ground material to classification to separate a portion comprising the coarser particle sizes from a portion comprising the finer sizes, subjecting a slurry of the finer portion to centrifugal sedimentation so correlated as to the speed of operation and the rate of introduction and the dilution of the material that the low orders of particle size are cut and separated as an effluent including said proportion of silicate constituent, combining the remainder of the finer portion in suitable proportions with the coarser portion, grinding the combined portions to a desired ultimate fineness, and burning the recombined and reground material as at least the major proportion of the ultimate cement raw material mixture.

13. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grindng the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, subjecting a slurry of the material so ground to centrifugal sedimentation so correlated as to the speed of operation and the rate of introduction and the dilution of the material that a substantial proportion of the weight of the feed comprising the finer particle sizes and including said proportion of undesirable mineral are cut and separated, as an effluent, from the coarser sizes, subjecting the finer particle sizes so separated to a second centrifugal sedimentation so correlated as to the speed of operation and the rate of introduction and the dilution of the material that the low orders of particle size are cut and separated as a second effluent including said proportion of undesirable mineral, and burning at least the remainder of said finer particle sizes as at least a substantial proportion of the ultimate cement raw material mixture.

14. In a method of manufacturing cement clinker in which an available inferior material is utilized and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, subjecting a slurry of the material so ground to centrifugal sedimentation so correlated as to the speed of operation and the rate of introduction and the dilution of the material that a substantial proportion of the weight of the feed comprising the finer particle sizes and including said proportion of undesirable mineral are cut and separated, as an effluent, from the coarser sizes, subjecting the finer particle sizes so separated to a second centrifugal sedimentation so correlated as to the speed of operation and the rate of introduction and the dilution of the material that the low orders of particle size are cut and separated as a second effluent including said proportion of undesirable mineral, combining and mixing the remainder of the finer particle sizes with the coarser sizes and burning the mixture as at least the major proportion of the ultimate cement raw material mixture.

15. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, agitating a slurry of the material so ground in the presence of a dispersing agent in quantity sufficient at least to minimize natural flocculation including particle size fractions coarser than the low orders of particle size, subjecting the dispersed slurry to centrifugal sedimentation so correlated as to the speed of operation and the rate of introduction and the dilution of the material that the low orders of particle size are cut and separated as an effluent including said proportion of undesirable mineral, and burning the remainder of said material as at least a substantial proportion of the ultimate cement raw material mixture.

16. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, agitating a slurry of the material so ground in the presence of a dispersing agent in quantity sufficient at least to minimize natural flocculation including particle size fractions coarser than about 3 microns, subjecting the dispersed slurry to centrifugal sedimentation so correlated as to the speed of operation and the rate of introduction and the dilution of the material that the low orders of particle size minus about 3 microns are cut and separated as an effluent including said proportion of undesirable mineral, and burning the remainder of said material as at least a substantial proportion of the ultimate cement raw material mixture.

17. In a method of manufacturing cement clinker in which an available inferior material is utilized, and in which the material is a member of the class consisting of argillaceous limestones, marls, and chalks, containing an undesirable proportion of at least one silicate mineral which can be released and increased in proportion in the low orders of particle size by grinding the material, and which is deficient in calcium carbonate; the improvement which comprises grinding the material to satisfactory fineness for burning and sufficiently to free physically a proportion of silicate particles at least equal to the undesirable proportion and to concentrate said proportion and increase the relative proportion of the silicate constituent to the proportions of useful constituents of the material in the low orders of particle size, subjecting a slurry of the material to centrifugal sedimentation so adjusted and correlated as to the speed of operation and the rate of introduction and the dilution of the material that a sufficient proportion of the total weight of the material comprising the low orders of particle size are cut and separated as an effluent including a sufficient proportiton of said silicate constituent to correct the relation between calcium carbonate and total silicon dioxide in the remainder of the material and to de-water said remainder, and burning said remainder as the ultimate cement raw material mixture.

18. In a method of manufacturing cement clinker in which available inferior materials are utilized, and in which the materials are similar members of the class consisting of argillaceous limestones, marls, and chalks, containing an undesirable proportion of at least one silicate mineral which can be released and increased in proportion in the low orders of particle size by grinding the materials, and which can be blended to produce a mixture only slightly deficient in calcium carbonate; the improvement which comprises grinding the materials to satisfactory fineness for burning and sufficiently to free physically a proportion of silicate particles at least equal to the undesirable proportion and to concentrate said proportion and increase the relative proportion of the silicate constituent to the proportions of useful constituents of the material in the low orders of particle size, blending the ground materials to produce a preliminary mixture slightly deficient in calcium carbonate, subjecting a slurry of the materials so blended to centrifugal sedimentation so correlated as to the speed of operation, and the rate of introduction and the dilution of the materials that a sufficient proportion of the total weight of the materials comprising the low orders of particle size are cut and separated as an effluent including a sufficient proportion of said silicate constituent to correct the relation between calcium carbonate and total silicon dioxide in the remainder of the materials and to de-water said remainder, and burning said remainder as the ultimate cement raw material mixture.

19. In a method of manufacturing cement clinker in which an available inferior material is utilized, and in which the material is a member of the class consisting of argillaceous limestones, marls, and chalks, containing an undesirable proportion of at least one silicate mineral which can be released and increased in proportion in the low orders of particle size by grinding the material, and which must be blended with at least one corrective in addition to eliminating said undesirable proportion of silicate; the improvement which comprises grinding the material to satisfactory kiln feed fineness for burning and sufficiently to free physically a proportion of silicate particles at least equal to the undesirable proportion and to concentrate said proportion and increase the relative proportion of the silicate constituent to the proportions of useful constituents of the material in the low orders of particle size, blending the ground material with the necessary proportion of ground corrective to provide the desired ultimate mixture, except for said undesirable proportion of silicate, subjecting a slurry of the blended material to centrifugal sedimentation so correlated as to the speed of operation and the rate of introduction and the dilution of the material that a sufficient proportion of the total weight of the material comprising the low orders of particle size are cut and separated as an effluent including a sufficient proportion of said silicate constituent to correct the relation between calcium carbonate and total silicon dioxide in the remainder of the material and to de-water said remainder, and burning said remainder as the ultimate cement raw material mixture.

20. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material to a degree sufficient to free physically a proportion of particles of the undesirable mineral at least equal to the undesirable proportion and to concentrate said proportion and increase the relative proportion of said mineral to the proportions of useful constituents of the material in the low orders of particle size, subjecting a slurry of the material so ground to centrifugal sedimentation so correlated as to the speed of operation and the rate of introduction and the dilution of the material that the low orders of particle size are cut and separated as an effluent including said proportion of undesirable mineral, diluting the remainder of the material to form a slurry, blending said slurry with the necessary proportion of a slurry of other material, and burning the blended material as the ultimate cement raw material mixture.

21. In a method of manufacturing cement clinker in which an available inferior material is utilized, and in which the material is a member of the class consisting of argillaceous limestones, marls, chalks, and siliceous components, each containing an undesirable proportion of at least one silicate mineral constituent which can be released and increased in proportion in the low orders of particle size by grinding the material; the improvement which comprises grinding the material to a degree sufficient to free physically a proportion of silicate particles and increase the relative proportion of the silicate constituent to the proportions of useful constituents in the low orders of particle size, subjecting the ground material to hydraulic classification to separate a portion comprising the coarser particle sizes from a portion comprising the finer sizes, thickening the finer portion to form a slurry of satisfactory density for centrifugal sedimentation, subjecting said slurry to centrifugal sedimentation so correlated as to the speed of operation and the rate of introduction and the dilution of the material that the low orders of particle size are cut and separated as an effluent including said proportion of silicate mineral, combining and mixing the remainder of the finer portion with the coarser portion and burning the recombined and mixed material as at least a substantial proportion of the ultimate cement raw material mixture.

22. In a method of manufacturing cement clinker in which an available inferior material is utilized, and in which the material is a member of the class consisting of argillaceous limestones, marls, chalks, and siliceous components, each containing an undesirable proportion of at least one mineral constituent which can be released and increased in proportion in the low orders of particle size by grinding the material; the improvement which comprises grinding the material in a closed hydraulic classification circuit to a degree sufficient to free physically a proportion of particles of the undesirable mineral at least equal to the undesirable proportion and to concentrate said proportion and increase the relative proportion of said mineral to the useful constituents of the material in the low orders of particle size, overflowing the material so ground from the classification circuit, thickening said overflow to form a slurry of satisfactory density for centrifugal sedimentation, subjecting said slurry to centrifugal sedimentation so correlated as to the speed of operation and the rate of introduction and the dilution of the material that the low orders of particle size are cut and separated as an effluent including said proportion of undesired mineral, and burning the remainder of said material as at least a substantial proportion of the ultimate cement raw material mixture.

CHARLES H. BREERWOOD.